United States Patent
Poupon

(10) Patent No.: US 6,186,194 B1
(45) Date of Patent: Feb. 13, 2001

(54) PROCESS AND DEVICE FOR BAGGING A CERTAIN NUMBER OF GRAINS IN EACH SACK

(75) Inventor: Jean-Marc Poupon, Toulouse (FR)

(73) Assignee: France Mais Union, Riscle (FR)

(*) Notice: Under 35 U.S.C. 154(b), the term of this patent shall be extended for 0 days.

(21) Appl. No.: 09/364,163

(22) Filed: Jul. 30, 1999

(30) Foreign Application Priority Data

Jul. 30, 1998 (FR) .................................................. 98 09953

(51) Int. Cl.⁷ ....................................................... B65B 1/04
(52) U.S. Cl. ......................... 141/83; 141/313; 141/114; 177/59
(58) Field of Search ..................... 141/83, 114, 313–316, 141/94, 10; 177/59

(56) References Cited

U.S. PATENT DOCUMENTS

| | | | |
|---|---|---|---|
| 4,874,049 | * 10/1989 | Kee et al. .............................. | 177/59 |
| 5,466,894 | * 11/1995 | Naef ..................................... | 177/59 |

FOREIGN PATENT DOCUMENTS

| | | |
|---|---|---|
| 3148439 | 3/1984 | (DE) . |
| 3802259 | 8/1989 | (DE) . |
| 3911988 | 10/1990 | (DE) . |
| 29709234 | 11/1997 | (DE) . |
| 2293903 | 4/1996 | (GB) . |
| WO 8500656 | 2/1985 | (WO) . |

\* cited by examiner

*Primary Examiner*—Steven O. Douglas
(74) *Attorney, Agent, or Firm*—Cantor Colburn LLP

(57) ABSTRACT

A process and a device for bagging a predetermined number of grains with heterogeneous granulometry per sack, particularly seed grains, having a structure for conveying grain by gravity toward means of filling sacks with grain that includes: a collection nozzle for grain arranged on a counter for counting the grain, the counter determining the number of grains n in a sample, a first weighing apparatus for weighing the grain counted, a calculator that takes data related to a number of grains and data related to the mass of that number of grains, and those data make it possible to find a theoretical mass of a predetermined number of grains in a sack, and a second weighing apparatus for weighing the sack, the index value of the second weighing apparatus being the theoretical mass found by the calculator, and when that theoretical mass is measured by the second weighing apparatus, the second weighing apparatus orders the bag filling to stop.

9 Claims, 5 Drawing Sheets

PROCESS AND DEVICE FOR BAGGING A CERTAIN NUMBER OF GRAINS IN EACH SACK

TECHNICAL FIELD

The invention concerns a process and a device for quickly bagging a certain number of grains, particularly seed grains.

BACKGROUND OF THE INVENTION

Seed grains are sold in sacks whose contents are determined not by the mass of the sack, but by the number of grains in the sack. For a sack of corn grain, this number is around 80,000.

The problem in bagging seed grains comes from the fact that seed grains naturally have different granulometric characteristics. Consequently, it is not possible to define the contents of a sack of seed grain by a mass of grains that would correspond to the predetermined number of grains required to fill a sack.

Traditionally, grain bagging is done in the following phases: the grain is first calibrated and then it is stored in different silos by caliber. For each caliber of grain, the mass of the number of grains required to fill a sack is known. (A sack of 80,000 high-caliber grains will be heavier than a sack of 80,000 low-caliber grains). The calibrated grains are then bagged by a bagging machine; the bagging operation is controlled by a scale whose index value is set on the basis of the caliber of the grains in the lot to be bagged. For each lot of grain to be bagged of different caliber, a different index value is set on the scale.

This seed grain bagging process usually used has many disadvantages, namely:
- the calibrating operation is difficult to carry out with precision,
- during calibration, a proportion of grain that may reach 10% is lost,
- calibration is a stressful operation for the grain,
- calibration is an expensive operation in terms of resources and time,
- it is necessary to store and manage stocks of grain of different calibers,
- the error in the number of grains per sack may reach 5% more or less.

A bagging device is also known from document DE 38 02 268. This device consists of taking grain samples from a flow of grain intended to be bagged. From these samples, the unit mass of the grain is calculated.

Knowing the number of grains that are to be bagged, the total mass of the number of grains that should comprise one sack is deduced from the unit mass of the grains composing the sample.

The operation counting the number of grains in the sample is not specified in this document. But that operation is essential, since the precision of the index value assigned to the bagging scale depends directly on the precision with which the grain counting is done.

SUMMARY OF THE INVENTION

The purpose of the invention is to provide a grain-bagging process and device that makes it possible to put into a sack a predetermined number of grains from lots of grains with heterogeneous granulometry, without a calibration operation and with a precision of more or less 2% for the number of grains.

For this purpose, the invention proposes a bagging process for a predetermined number of grains with heterogeneous granulometry per sack, particularly seed grains, which includes the following phases:
- grains are collected from a flow of grain intended to be put into sacks,
- the grains collected are subjected to a vibration operation to ensure distribution of the grain and to take them to an acceleration device,
- the grains go onto an inclined acceleration chute in order to single them out,
- the grains are counted by counting cells located at the bottom of the acceleration channels,
- when the grains are counted, the feeding of the channels of the acceleration chute is stopped,
- the counted grains are weighed,
- the number n of grains and the mass of that number n of grains are sent to a calculator that takes these data and finds the theoretical mass of the predetermined number of grains in a sack,
- the flow of grains fills a sack placed on a weighing system whose index value is the theoretical mass found by the calculator,
- when the theoretical mass is measured by the weighing system, the weighing system orders the sack filling to stop,
- the phases described above are repeated at predetermined intervals until the flow of grain to be bagged is exhausted,
- the index value of the weighing system is updated each time the calculator finds the theoretical mass of the predetermined number of grains in a sack.

This process makes it possible to bag grains with heterogeneous granulometry and thus to dispense with the grain calibration operation, intermediate storage of different calibers of grain and subsequent handling operations.

Preferably, the number of grains n counted is around 10,000 to 18,000.

Advantageously, the theoretical mass of the predetermined number of grains in a sack, found by the calculator and sent to the weighing system is established by at least two of the last measurements of the mass of a sample of n grains. This makes it possible to give the weighing system an index value based on a trend, not one isolated measurement that can be marred by error or non-representative of the lot of grain intended to be bagged.

The invention also proposes a device based on the process just described, a bagging device for a predetermined number of grains with heterogeneous granulometry per sack, particularly seed grains, which has a structure for conveying grain by gravity to the grain-bagging means controlled by a weighing system, which includes, according to the invention:
- a nozzle for collecting grain arranged on the means of conveying the grain,
- a horizontal vibrating plate, equipped with channels on the side receiving the grain, with vibrations that ensure distribution of the grains in each of the channels and a shifting movement of the grain,
- a chute that includes channels into which the grain slides; the chute is inclined at an angle so that the grain in it is subject to an almost free fall,
- means of counting located perpendicular to each channel of the chute, a weighing hopper to take the grain after counting, means of controlling the vibrations of the horizontal plate, means of weighing the grain counted, a calculator that takes in data related to the number of grains and data related to the mass of that number of grains; these data make it possible to find the theoretical mass of the predetermined number of grains in a sack, means of weighing the sack, known by themselves, whose index value is the theoretical mass found by the calculator, when that theoretical mass is measured by the weighing system, the weighing system orders the sack filling to stop.

The counting operation done with the counting device in the invention makes it possible to obtain a remarkably precise count of the number of grains in a sample. This precision is obtained in particular because the grains are singled out when the grain goes into the chute, which allows a single grain to be present in front of the counting cell. The final precision of the bagging depends directly on the precision with which the sample-counting operation is done.

Advantageously, the channels in the inclined chute have a convergent profile, which prevents two grains from being present at the same time in front of the counting means.

Preferably, the counting means are composed of optic cells.

Preferably, the weighing hopper is placed on weighing sensors which measure the mass of the grains counted.

Preferably, the number of channels in the vibrating plate, the number of channels in the chute and the number of counting cells is equal to 16.

Advantageously, the vibrating plate is equipped with two suction hoods located above and below it that suck the dust inevitably present during the handling of the grain and make it possible to keep the counting cells clean.

BRIEF DESCRIPTION OF THE DRAWINGS

The invention will be better understood from the following description, with reference to the attached schematic drawings.

DETAILED DESCRIPTION OF THE PREFERRED EMBODIMENT

Figure 1:
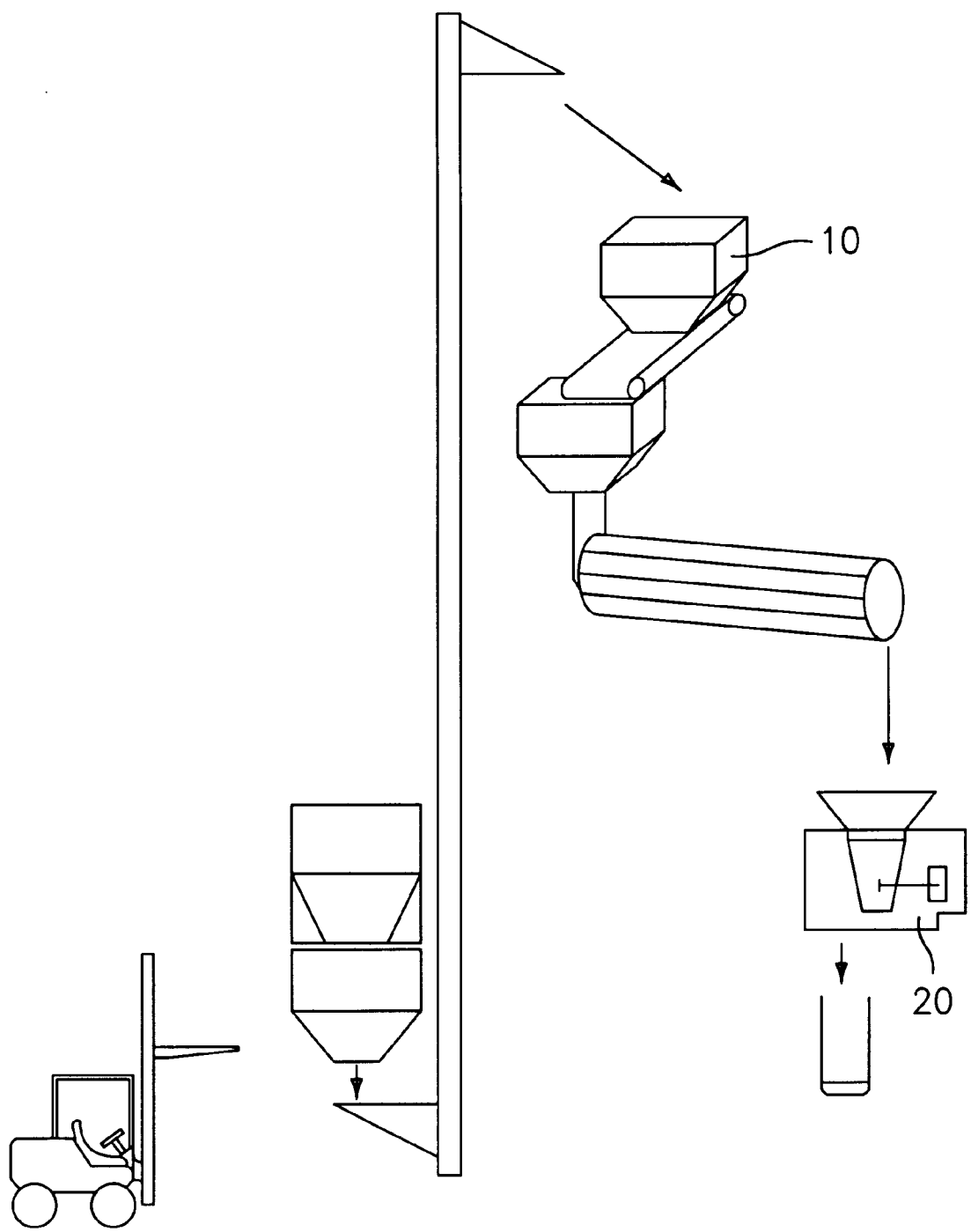
FIG. 1 is a diagram of a state-of-the-art bagging device.

FIG. 1 shows the known bagging device. In this device, pre-calibrated grain is placed in a hopper 10, from which it goes down by gravity through a chute toward a weighing system 20 whose index value is set manually, as a function of the caliber of the grain. When the index value of the weighing system 2 is reached, the filling of the sack stops and the filling of the next sac starts.

Figure 2:
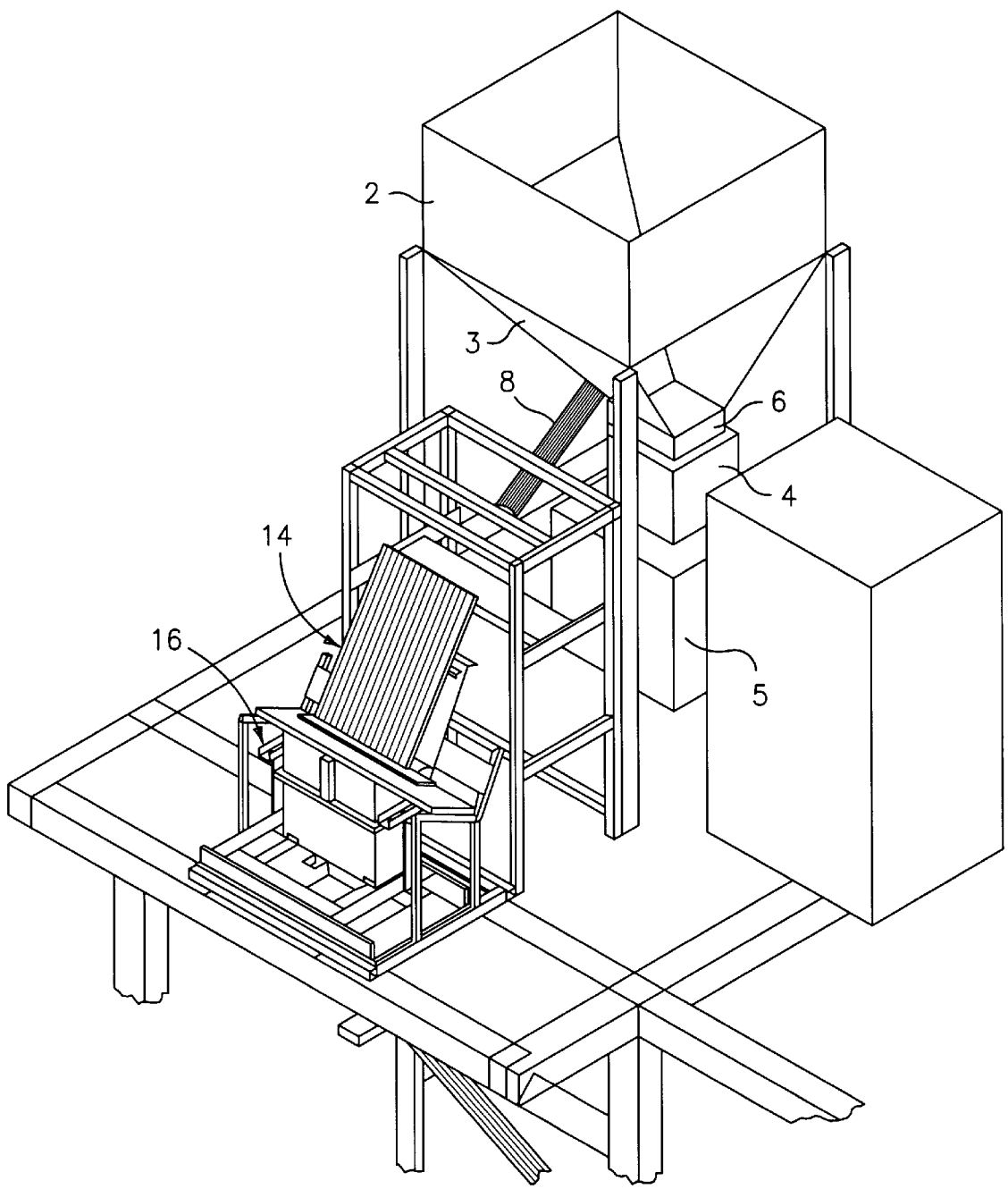
FIG. 2 is a perspective view showing the bagging device in the invention.
Figure 7:
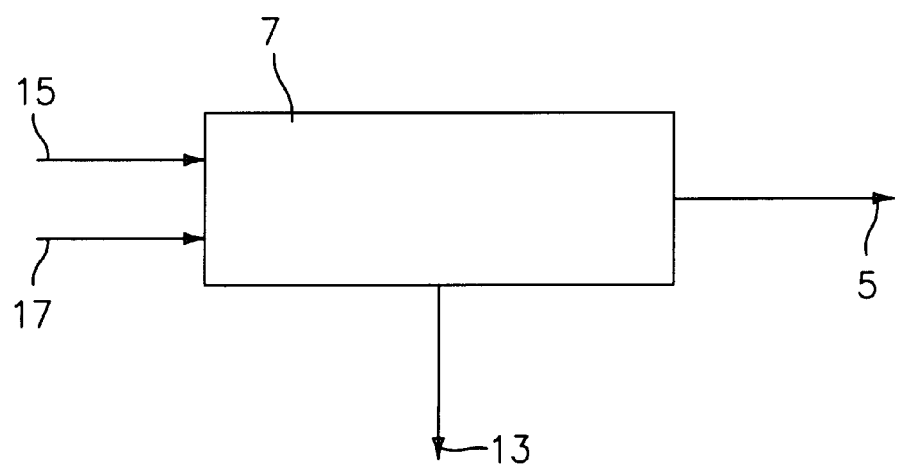
FIG. 7 is a diagram showing the operation of the calculator.

As shown in FIG. 2, the device of the present invention includes a hopper 2 placed on a soldered mechanical frame. A convergent conduit 3 connects the hopper 2 to a device for filling a sack 4 placed on a scale 5. At the end of the conduit 3 there is a sealing device 6. The scale 5 is connected to a calculator 7, as shown in FIG. 7.

Figure 3:
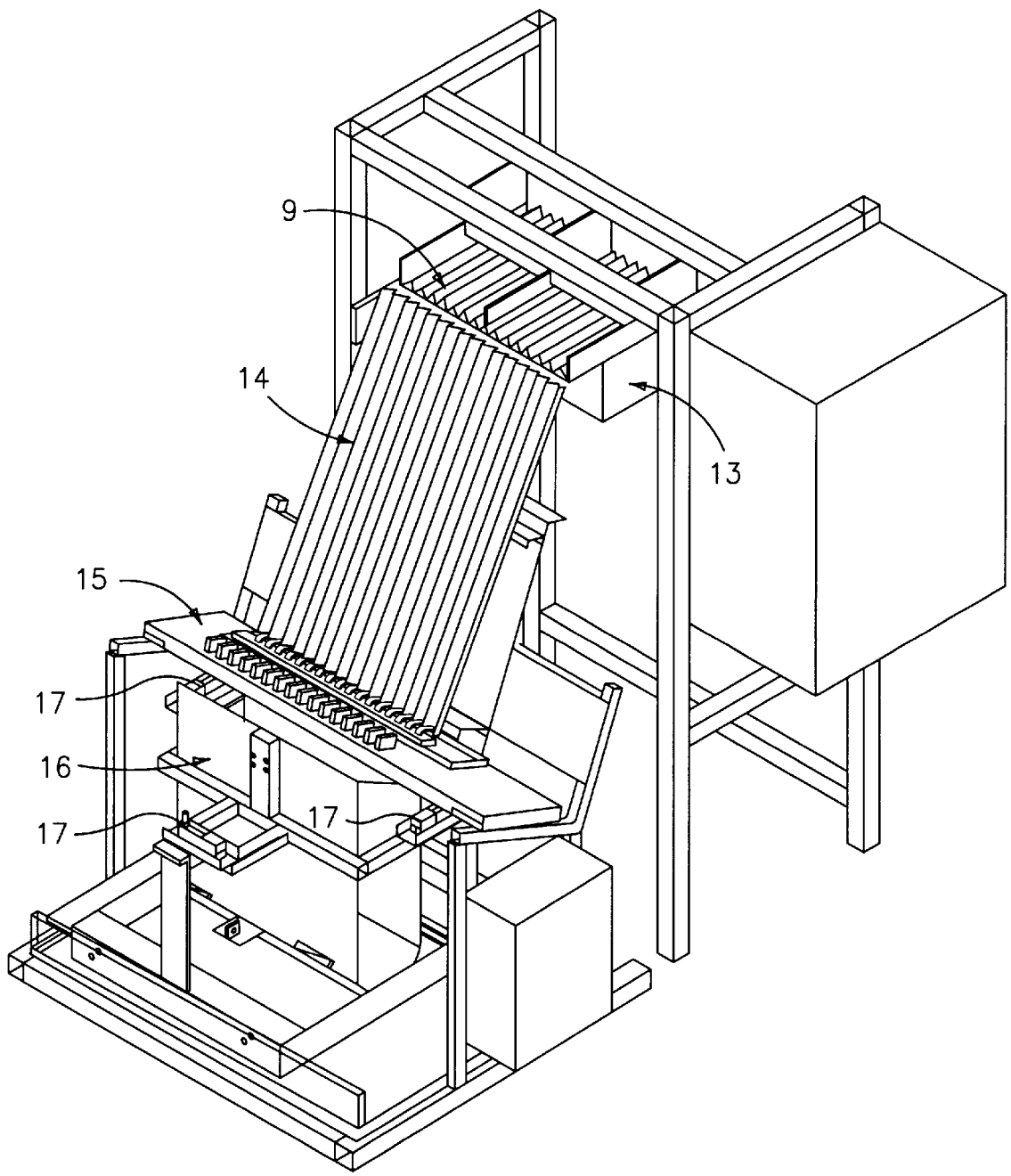
FIG. 3 is a perspective view of the sample-counting device.
Figure 4:
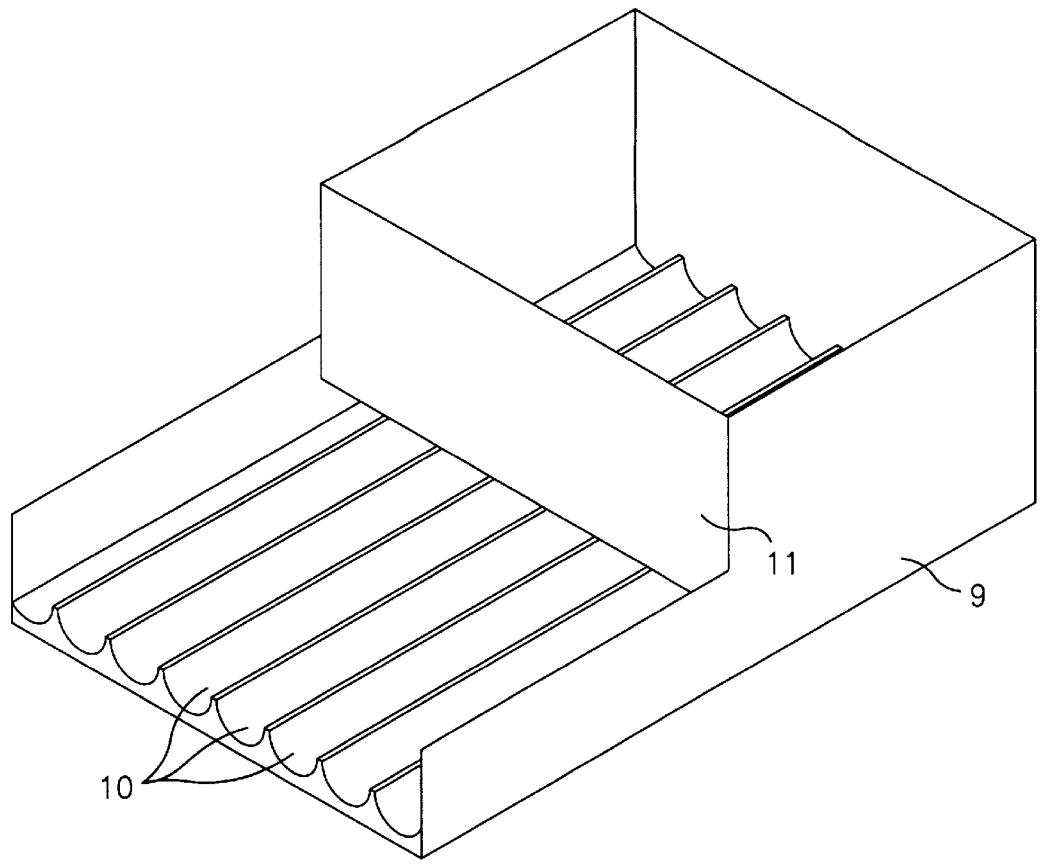
FIG. 4 is a perspective view of a vibrating plate.
Figure 5:
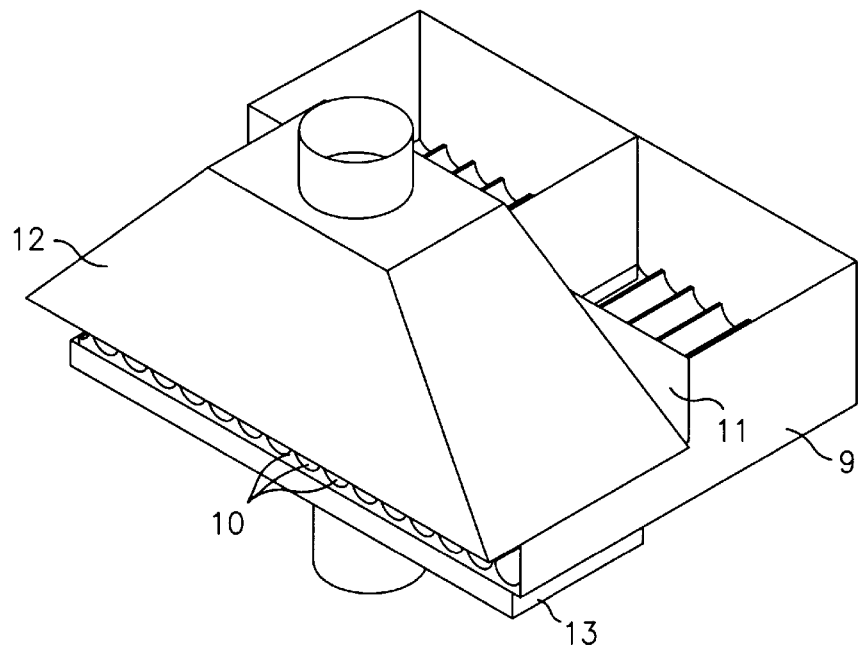
FIG. 5 is a perspective view of a vibrating plate equipped with suction hoods.
Figure 6:
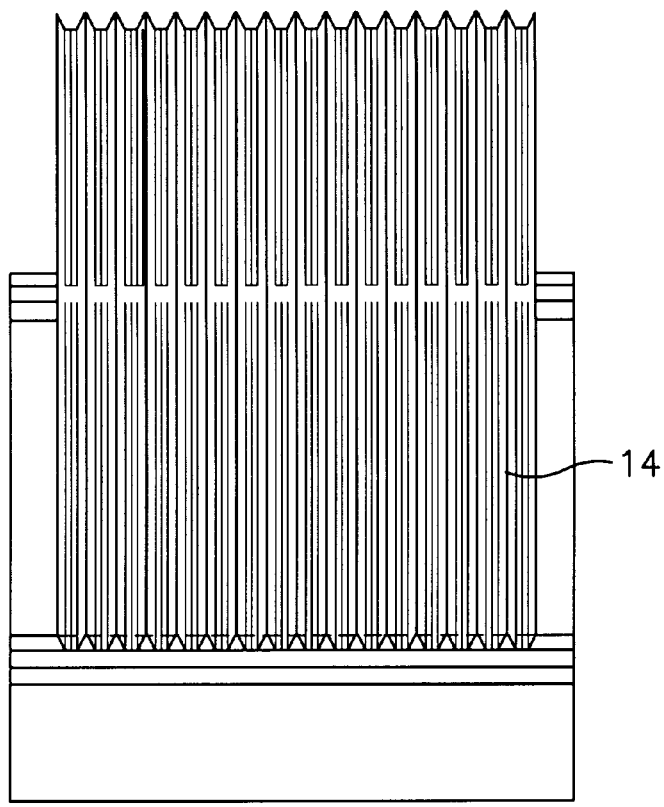
FIG. 6 is a front view of the acceleration chute.

A collection nozzle 8 is arranged on the conduit 3. As FIG. 3 shows, on the lower end of the collection nozzle 8, there are two plates 9. The top side of each of the plates 9 is equipped with eight channels 10 and a partition 11, as shown in FIG. 4. On the lower and upper sides of the plates 9 there are suction hoods 12, as shown in FIG. 5. The plates 9 are placed on vibrators 13 whose activation is controlled by the calculator 7. On the edge of the plates 9, there is an acceleration chute 14. As shown in FIG. 6, the chute 14 is equipped with sixteen channels. The channels of the acceleration chute have convergent profiles.

The chute 14 is inclined at an angle that is almost vertical. Perpendicular to each channel in the acceleration chute are sixteen counting cells 15. The counting cells are connected to the calculator, as shown in FIG. 7. A hopper 16 is placed under the acceleration chute. The hopper 16 rests on weighing sensors 17 connected to the calculator, as shown in FIG. 7.

The bagging device of the present invention works as follows:

Grains with heterogeneous granulometry that have not gone through any prior calibration operation are introduced into the hopper 2. By the effect of gravity, the grain is directed toward the bag-filling device 4.

Grain is collected by the nozzle 8 out of the flow of grain intended to be bagged. The grain collected is diverted onto the plates 9 in which it is held by the partition 11. Due to the forces of friction between the grains, they remain blocked in the part of the plates 9 upstream from the partition 11.

At regular intervals, the calculator activates the vibrators 13 placed under the plates 9.

The vibrations impress a shifting movement on the grains. The suction hoods 12 suck the dust generated by the movement of the grain. The grain is led toward the acceleration chute 14. Due to the sharp inclination of the acceleration chutes, the grain is subjected to an almost free fall and, due to the convergence of the channels, the grains arriving at the lower end of the acceleration chute are separated from one another.

When the grains leave the acceleration chutes, they pass in front of the counting cells 15, which measure the number of grains. When the counting cells have measured between 10,000 and 15,000 grains, the calculator commands the vibrators 13 to rest. This stops the supply of grain to the acceleration chute. The counted grains are then gathered in a hopper 16. This hopper is placed on weighing sensors 17 which measure the mass of grain counted by the counting cells. The measurements of the number of grains and the mass of the number of grains counted are sent to the calculator which determines the theoretical mass of the 80,000 grains normally present in a sack of seed grains.

When the mass of the sack measured by the scale 5 is equal to the theoretical mass, the scale orders the sealing device 6 closed.

The invention thus provides a bagging device for heterogeneous grain that has not gone through any calibration operation which has the advantages given above. It specifically makes it possible to dispense with the grain-calibration operation, intermediate storage of different calibers of grains and subsequent handling operations. It also makes it possible to achieve a grain-bagging operation with a precision of more or less 2% for the number of grains.

It is obvious that the invention is not limited to the embodiment described above by way of example, but that it can include, on the contrary, all variations of embodiment, particularly as regards counting the grains in the sample collected.

What is claimed is:

1. A process for bagging a predetermined number of grains with heterogeneous granulometry per sack, comprising:

collecting grain out of a flow of grain intended to be bagged, subjecting the grain collected to a vibration operation to ensure distribution of the grain and take it to an acceleration device, passing the grains through an inclined acceleration chute in order to single them out, counting the grains by counting cells located at the bottom of acceleration channels, stopping the feed of the grains to the acceleration channels when n grains are counted, weighing the grains counted, sending the number n of grains and a mass of that number n of grains to a calculator which takes those measurements and finds a theoretical mass of a predetermined number of grains in a sack, filling a sack with a flow of grains, the sack being placed on a weighing system whose index value is the theoretical mass of the predetermined number of grains in a sack found by the calculator, ordering the bag filling to stop when the theoretical mass is measured by the weighing system, repeating the proceeding operations at predetermined intervals until the flow of grain to be bagged is exhausted, and updating the index value of the weighing system each time the calculator finds the theoretical mass of the predetermined number of grains in a sack.

2. The grain-bagging process in claim 1, wherein the number n of grains counted is on the order of 10,000 to 15,000.

3. The grain-bagging process in claim 1, wherein the theoretical mass of the predetermined number of grains in a sack found by the calculator is established from at least two of the last measurements of the mass of a sample of n grains.

4. A bagging device for a predetermined number of grains per sack with heterogeneous granulometry, particularly seed grain, including a member for conveying the grain by gravity toward a component for filling sacks with the grain, comprising:

a grain-collecting nozzle arranged on the grain conveying member, a horizontal vibrating plate whose side receiving the grain is equipped with channels, with vibrations ensuring distribution of the grain in each of the channels and a shifting movement of the grain, a chute containing channels into which the grain slides, with the chute being inclined at an angle so that the grains in it are subjected to an almost free fall, a counter located perpendicular to each channel of the chute, a weighing hopper that takes the grain after counting, a controller for controlling the vibrations of the horizontal plate, a first weighing apparatus for weighing the grain counted, a calculator that takes data related to the number of grains and data related to the mass of that number of grains and with these data makes it possible to find a theoretical mass of a predetermined number of grains in a sack, and a second weighing apparatus for weighing the bag, the second weighing apparatus having an index value which is the theoretical mass found by the calculator, when that theoretical mass is measured by the second weighing apparatus, the second weighing apparatus orders the sack filling to stop.

5. The grain-bagging device in claim 4, wherein the channels made in the inclined chute have a convergent profile; this convergence prevents two grains from appearing in front of the counter at the same time.

6. The grain-bagging process in claim 4, wherein the counter comprises optic cells.

7. The grain-bagging process in claim 6, wherein the number of channels in the vibrating plate, the number of channels in the chute and the number of counting cells is equal to 16.

8. The grain-bagging process in claim 4, wherein the weighing hopper is placed on weighing sensors which measure the mass of the grains counted.

9. The grain-bagging process in claim 4, wherein the vibrating plate is equipped with two suction hoods located above and below the vibrating plate.

* * * * *